(12) United States Patent
Deligianni et al.

(10) Patent No.: US 7,993,498 B2
(45) Date of Patent: Aug. 9, 2011

(54) APPARATUS AND METHOD OF ELECTROLYTIC REMOVAL OF METALS FROM A WAFER SURFACE

(75) Inventors: Hariklia Deligianni, Tenafly, NJ (US); Laertis Economikos, Wappingers Falls, NY (US); Catherine Ivers, Hopewell Junction, NY (US); Xiaoyan Shao, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 11/834,971

(22) Filed: Aug. 7, 2007

(65) Prior Publication Data

US 2009/0038960 A1 Feb. 12, 2009

(51) Int. Cl.
*C25D 17/00* (2006.01)
(52) U.S. Cl. ........................................ 204/212; 204/280
(58) Field of Classification Search ............... 205/662, 205/663; 204/212, DIG. 12, 227, 280
See application file for complete search history.

(56) References Cited

U.S. PATENT DOCUMENTS

| | | | |
|---|---|---|---|
| 6,811,680 B2 * | 11/2004 | Chen et al. | 205/662 |
| 7,638,030 B2 * | 12/2009 | Nabeya et al. | 205/652 |
| 2003/0213703 A1 * | 11/2003 | Wang et al. | 205/662 |
| 2004/0053560 A1 | 3/2004 | Sun et al. | |
| 2004/0154931 A1 * | 8/2004 | Hongo et al. | 205/676 |
| 2004/0214510 A1 | 10/2004 | So | |
| 2005/0124262 A1 | 6/2005 | Manens | |
| 2006/0124474 A1 * | 6/2006 | Tsai et al. | 205/686 |
| 2006/0229007 A1 | 10/2006 | Mavliev et al. | |

OTHER PUBLICATIONS

Integrated Electro-Chemical Planarization (Ecmp) for Future Generation Device Technology, L. Economikos et al. (Date Unknown).

* cited by examiner

*Primary Examiner* — Luan V Van
(74) *Attorney, Agent, or Firm* — Jennifer R. Davis; Roberts Mlotkowski Safran & Cole, P.C.

(57) ABSTRACT

An apparatus and method designed to remove metals from a wafer surface using an electrolytic removal process. The apparatus includes a conductive pad having a plurality of alternating cathodes and anodes provided with a power source. The conductive pad is structured and configured to contact all metal islands on a surface of the wafer. Gaps are provided between pairs of the plurality of alternating cathodes and anodes.

17 Claims, 4 Drawing Sheets

APPARATUS AND METHOD OF ELECTROLYTIC REMOVAL OF METALS FROM A WAFER SURFACE

FIELD OF THE INVENTION

The invention relates to an apparatus and method of removing metals from a wafer surface and, more particularly, to an apparatus and method of electrolytic removal of metals from a wafer surface.

BACKGROUND DESCRIPTION

Integrated circuits include millions of active devices interconnected to form functional circuits and components. To form the interconnection structures, in one conventional semiconductor manufacturing process, metallized vias or contacts are formed by a blanket metal deposition followed by a chemical mechanical polish (CMP) step or, alternatively, an electrochemical mechanical polishing (eCMP) step.

Being more specific, in one known fabrication process, via holes are etched through an interlevel dielectric (ILD) to interconnection lines or a semiconductor substrate. Next, a thin adhesion layer such as tantalum nitride and/or tantalum is generally formed over the ILD and is directed into the etched via holes. Then, a metal film is blanket deposited over the adhesion layer and into the via holes. Deposition is continued until the via holes are filled with the blanket deposited metal. The deposition process, however, causes metal such as, for example, Cu, to be deposited on the surface of the wafer. The Cu thickness varies across pattern densities for example more Cu is deposited on high density areas As is known, it is necessary to remove the excess metal on the surface of the wafer. Such removal can be accomplished using a chemical mechanical polishing (CMP) or electrochemical mechanical polishing (eCMP). In known eCMP process a small metal anode is placed on the center of the polishing pad. The edge of the wafer is continuously contacting the anode. The pad is perforated and with the conductive electrolutic solution contacts the cathode on the back of the pad and forms a closed circuit. This method requires that a continuous layer of Cu is across the wafer to maintain a closed circuit. Once islands of Cu are formed the circuit opens and removal stops. Therefore, is used to only remove the bulk Cu leaving approximately 2000 A to be removed on another platten by conventional CMP.

To remove the metal from the surface of the wafer, a current is applied to the cathodes and anodes of the conductive pad, while pressure is maintained against the surface of the wafer. During the polishing process, the pad and wafer are rotated with respect to each other. An abrasive and chemically reactive solution, commonly referred to as a "slurry", as well as an electrolytic solution, is applied to the conductive pad during polishing. The slurry initiates the polishing process by abrading and chemically reacting with the film being polished; whereas, the electrolytic solution closes the circuit between the anodes and cathodes of the conductive pad. As current is passed between the cathodes and anodes, the metal on the wafer surface is dissolved by the anode.

However, in current processing,-the anode is conducting the edge of the wafer during a polishing process, the anode cannot make contact with metal islands on the surface of the wafer after the bulk copper is removed and islands start to form. That is, these metal islands, which are isolated, do not make contact with the anode and, as such, are not dissolved by the anode. This being the case, it is not possible, with known tools, to polish the entire surface of the wafer.

Accordingly, there exists a need in the art to overcome the deficiencies and limitations described hereinabove.

SUMMARY OF THE INVENTION

In a first aspect of the invention, an apparatus comprises a conductive pad having a plurality of alternating cathodes and anodes provided with a power source. The conductive pad is structured and configured to contact all metal islands on a surface of the wafer. Gaps are provided between pairs of the plurality of alternating cathodes and anodes.

In another aspect of the invention, an apparatus for-polishing a wafer surface comprises a table and a conductive pad coupled to the table. The pad has a plurality of alternating cathodes and anodes provided with a power source. A moving mechanism is configured to move the table thereby ensuring that the conductive pad contacts all metal islands on a surface of the wafer as the wafer is rotated.

In yet another aspect of the invention, a method of removing metal from a wafer surface comprises contacting an entire surface of a wafer to be cleaned with a conductive pad having a plurality of alternating cathodes and anodes. The method includes providing a power source to the plurality of alternating cathodes and anodes to dissolve the metal from the wafer surface including isolated metal islands.

DETAILED DESCRIPTION OF EMBODIMENTS OF THE INVENTION

The invention relates to an apparatus and method of removing metals from a wafer surface. More specifically, the invention relates to an apparatus and method of electrolytic removal of metals from a wafer surface using eCMP. By implementing the invention, it is possible to clean the entire wafer surface of metal such as, for example, Cu, using an electrolytic removal process. In embodiments, the entirety of the surface is polished by ensuring that the entire wafer surface comes into contact with a conductive pad. Thus, by using the invention, it is possible to remove isolated islands of metal such as Cu from the surface of the wafer. The apparatus and method of the invention does not remove the metal lines within the via holes or trenches.

As discussed in greater detail below, the invention is implemented by using an array of cathodes and anodes with low conductivity solution, for example. In one embodiment, the conductive pad is larger than the size of the wafer thus ensuring complete contact and hence removal of all metal islands on the surface of the wafer. In another embodiment, the conductive pad is radially moved on the wafer to ensure full contact with all metal, e.g., Cu, which is left on the surface of the wafer after a metallization process. Accordingly, in both embodiments, the apparatus and method of the invention is configured to ensure that there will no breaks in contact with any of the isolated islands.

Figure 1:
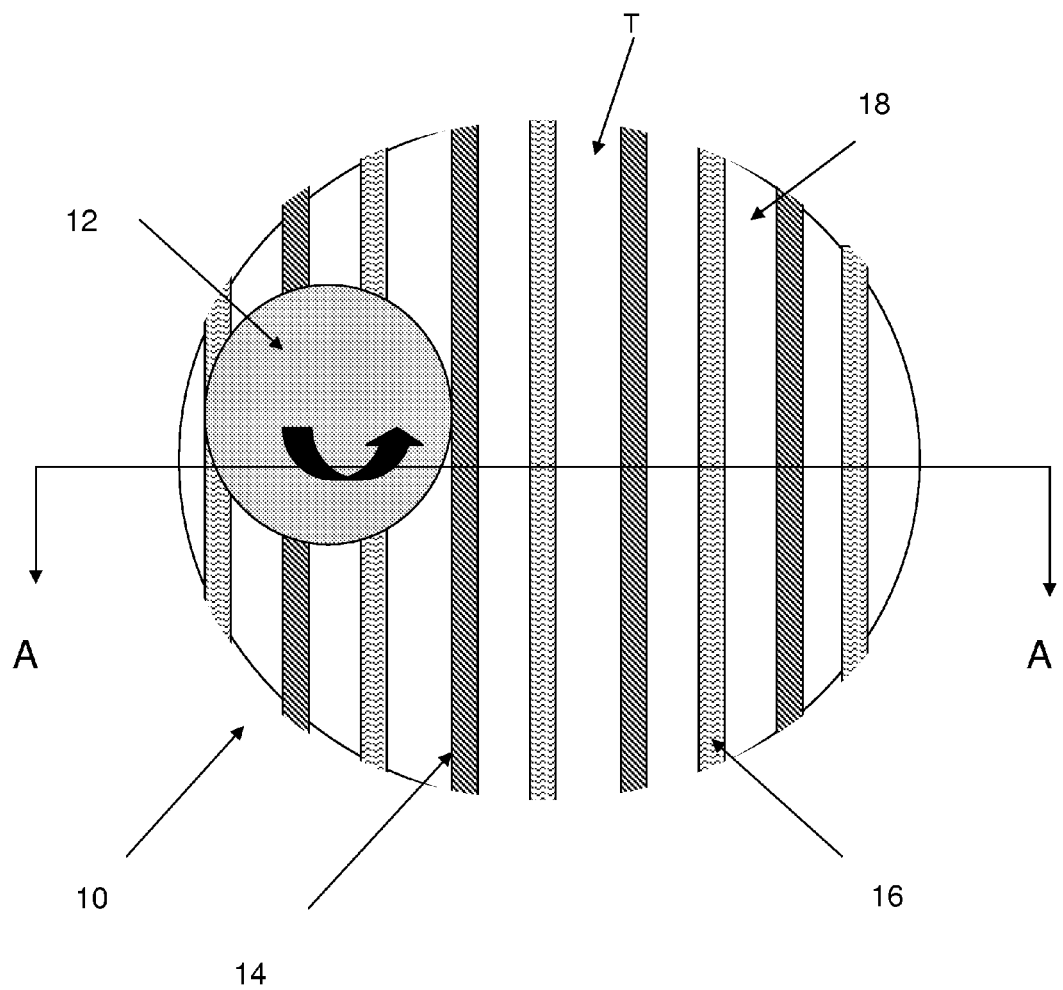
FIG. 1 shows an electrode array (conductive pad) according to an embodiment of the invention.

FIG. 1 shows an electrode array (conductive pad) according to an embodiment of the invention. In the structure of FIG.

1, the electrode array, e.g., conductive pad, 10 is larger than a diameter of the wafer 12 to be polished. In one embodiment, the diameter of the conductive pad 10 is approximately 30 inches, which is an approximate size of a standard platen table; although the conductive pad 10 can be any other diameter including approximately a diameter of the wafer 12. In the case that the conductive pad 10 and the wafer 12 have approximately the same diameter, e.g., approximately 300 mm, the wafer 12 and the conductive pad 10 should be carefully aligned to ensure that the entire surface of the wafer 12 to be polished is in contact with the conductive pad 10. In any situation, the advantage of the invention is that the entire surface of the wafer 12, e.g., all metal islands, comes into contact with the conductive pad 10.

Still referring to FIG. 1, the conductive pad 10 includes alternating cathodes 14 and anodes 16 supported by a table "T". The cathodes 14 and anodes 16 may be made from any conductive material. These conductive materials may be, by way of non-limiting examples, a polymeric conductive material or any metal or metal alloy. In embodiments, the cathodes 14 and anodes 16 may also include an abrasive such as silica or alumina.

A gap 18 is provided between each of the cathodes 14 and the anodes 16. The gap 18 is filled with a low conductivity solution which is used as an electrolyte. The low conductivity solution will close the circuit between the cathodes 14 and anodes 16. The low conductivity solution may include, for example, deionized water or very dilute acid. The low conductivity solution can also include an abrasive such as silica, alumina or other known abrasives. The abrasives will act as the slurry for the mechanical polishing portion of the eCMP process.

It should be recognized that the conductivity solution and the slurry can be tailored to provide effective polishing to metal layers at desired polishing rates while minimizing surface imperfections, defects and corrosion and erosion. By way of one example, alumina can be suspended in an oxidizing, aqueous medium. Slurries containing alumina, hydrogen peroxide, and either potassium or ammonium hydroxide are useful for removing tungsten at predictable rates with little removal of the underlying insulating layer. Many other slurry and electrolyte compositions are used to react and selectively abrade the surface of a substrate.

In operation, with an applied current between the cathodes 14 and anodes 16, metal on the surface of the wafer (e.g., metal that is not electrically connected to the power supply) will be dissolved by the anode, and hydrogen will be generated at the cathode. The applied current can be a direct current (DC) or an alternating current (AC). The cathodes 14 and anodes 16 can be powered with different voltages (profiles) from the center to the edge, thus allowing the engineer to tune the conductive pad for specific applications. This can be done by independently supplying each cathode/anode pair with a power source or controlling the power source with a controller.

In operation, the conductive pad 10 and wafer 12 may be rotated during the polishing process. The rotation of the conductive pad 10 may be accomplished using any known rotating mechanism including for example a belt system, gear system, combination thereof, etc. The rotation is at low RPMs such as, for example, about 10-20 RPM and more preferably about 15 RPM. In the embodiment of FIG. 1, the entire surface of the wafer is contacted by the conductive pad 20 thereby ensuring that contact is made with any and all metal islands that are formed on the wafer during metallization processes.

Figure 2:
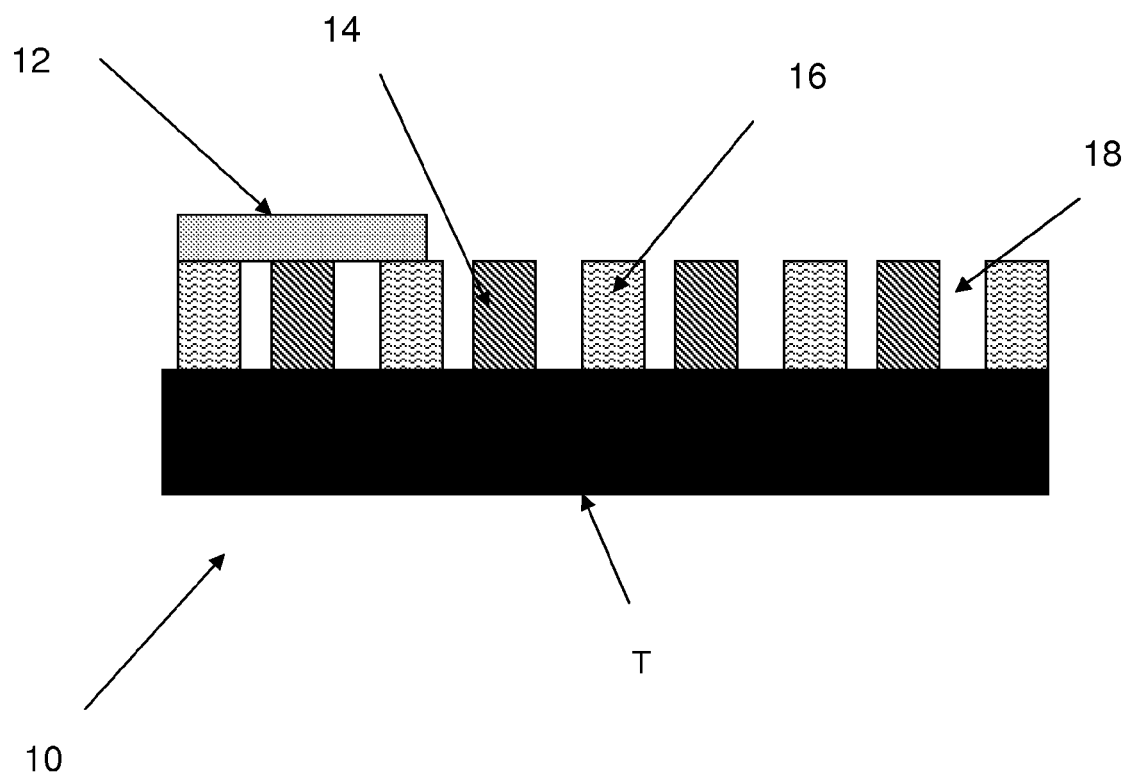
FIG. 2 shows a cross sectional view of the conductive pad (and wafer) of FIG. 1, along line A-A.

FIG. 2 shows a cross sectional view of FIG. 1, along line A-A. As seen in FIG. 2, the conductive pad 10 includes alternating cathodes 14 and anodes 16. As clearly seen in this cross sectional view, the diameter of the conductive pad 10 is larger than the diameter of the wafer 12. The cathodes 14 and anodes 16 are supported on the table "T", which is configured to rotate using any conventional mechanism.

Figure 3:
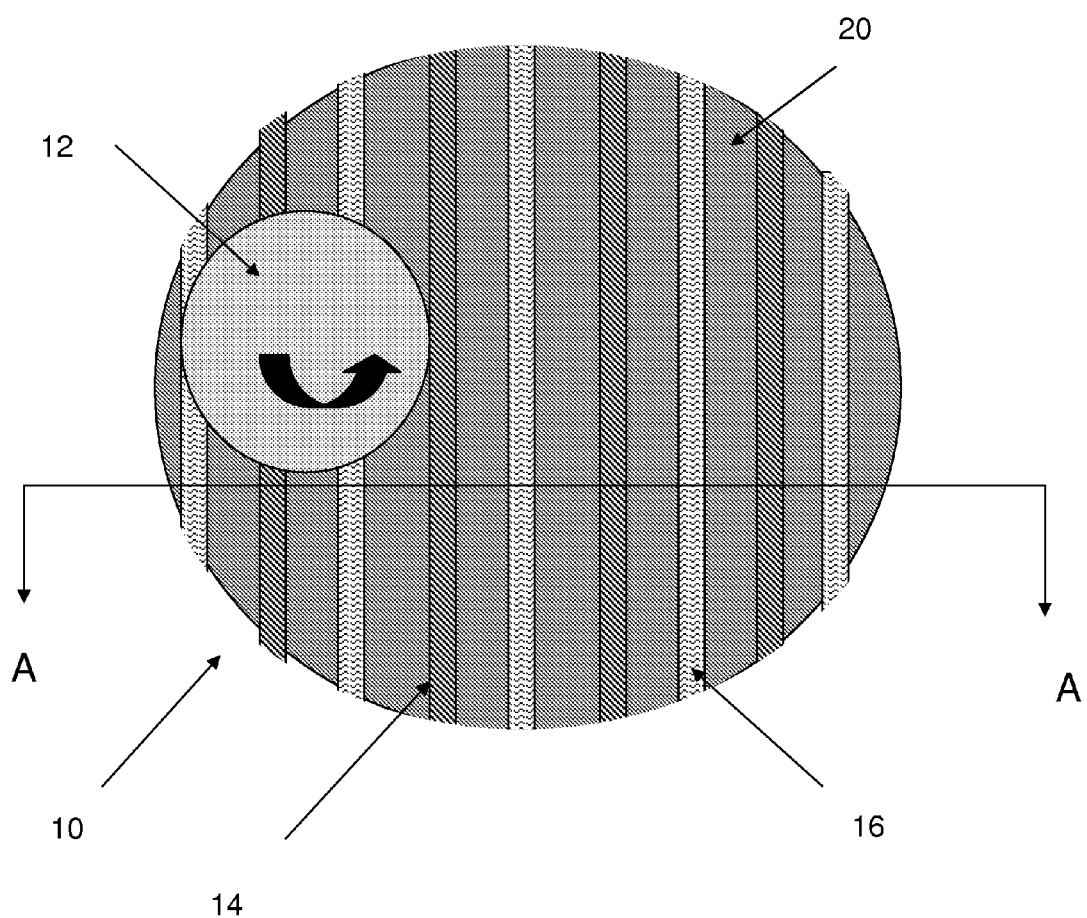
FIG. 3 represents another embodiment of the conductive pad in accordance with the invention.

FIG. 3 represents another embodiment in accordance with the invention. In this embodiment, the conductive pad is still larger than a diameter of the wafer 12. As in FIG. 1, the diameter of the conductive pad 10 can be approximately 30 inches, which is about the size of a standard platen table; although the conductive pad 10 can be any other diameter including approximately a diameter of the wafer 12. Utilizing any diameter, even smaller as discussed below, the advantage of the invention is that the conductive pad 10 contacts the entire surface of the wafer 12 to be polished; that is, the conductive pad 10 comes into contact with the metal islands on the wafer formed as the bulk Cu is removed and starts to clear across the wafer.

As in the embodiment of FIG. 1, the conductive pad 10 includes alternating cathodes 14 and anodes 16 positioned on table "T". The cathodes 14 and anodes 16 may be any conductive material such as, for example, a polymeric conductive material or any metal or metal alloy. In embodiments, the cathodes 14 and anodes 16 may also include an abrasive such as silica or alumina.

In the embodiment of FIG. 3, the gaps 18 between the cathodes 14 and the anodes 16 are filled with a non-conductive pad 20. The non-conductive pad 20 may be a perforated non-conductive polymeric pad. The non-conductive pad 20 may include a low conductivity solution which is used as the electrolyte and/or slurry as discussed above. Again, the low conductivity solution may include, for example, deionized water or very dilute acid, or other compositions described herein. The low conductivity solution will close the circuit between the cathodes 14 and anodes 16. The low conductivity solution and/or the non-conductive pad 20 can include an abrasive such as silica.

Again, the cathodes 14 and anodes 16 can be powered with different voltages (profiles) from the center to the edge by independently supplying each cathode/anode pair with a power source or controlling the power source. This allows tuning of the conductive pad 10. Also, in operation, the conductive pad 10 and the wafer 12 may be rotated during the polishing process. The rotation of the conductive pad 10 is at low RPMs such as, for example, about 10-20 RPM and more preferably at about 15 RPM. As with the embodiment of FIG. 1, the entire surface of the wafer 12 is contacted by the conductive pad 10 thereby ensuring that contact is made with any and all metal islands.

Figure 4:
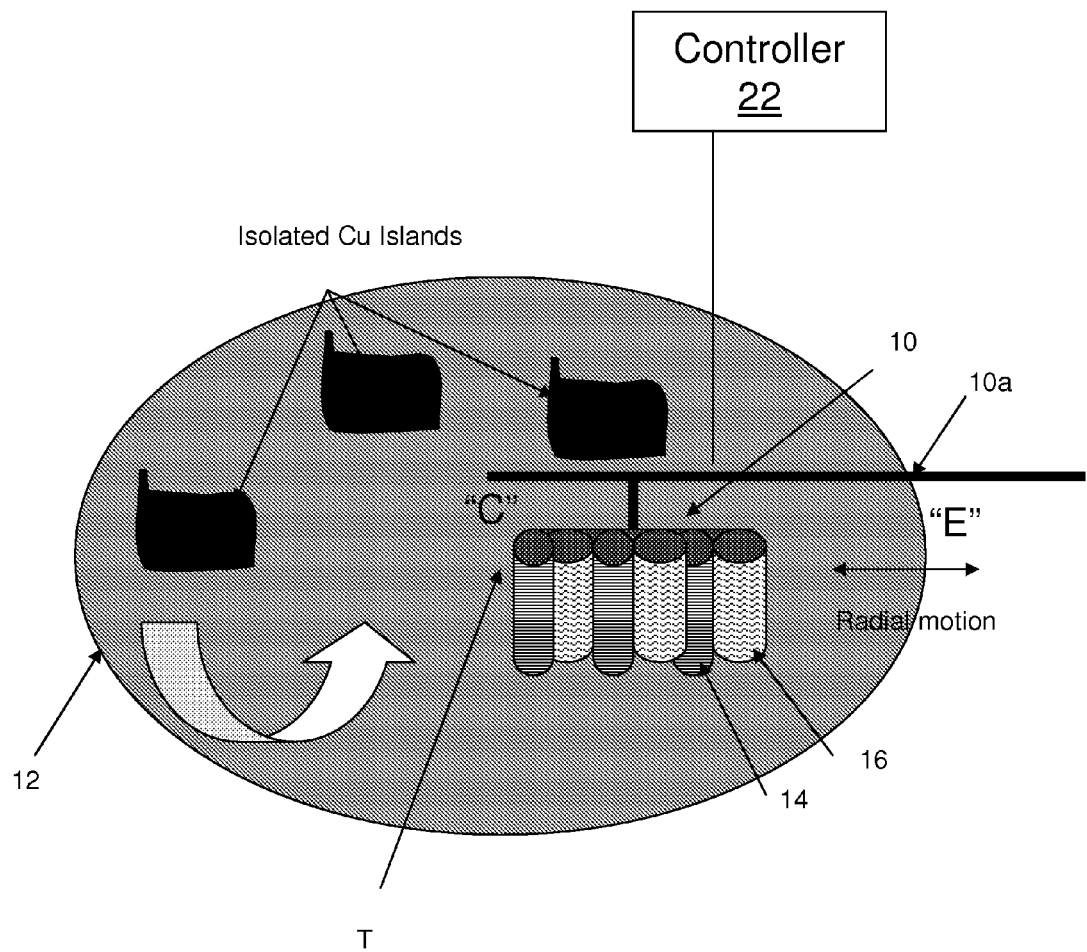
FIG. 4 represents another embodiment of the conductive pad in accordance with the invention.

FIG. 4 represents another embodiment in accordance with the invention. In this embodiment, the conductive pad 10 may include the configuration of either the embodiments of FIG. 1 or FIG. 3, e.g., the conductive pad 10 can include the gaps or non-conductive pad 20, depending on the desired application.

In the embodiment of FIG. 4, the conductive pad 10 is smaller than the wafer and is coupled to a moving mechanism 10a, which is designed to move the conductive pad in a radial direction as the wafer rotates. The moving mechanism 10a may be, for example, a linear actuator, rack and pinion gear system, belt driven system or other type of system capable of moving the conductive pad to a center "C" of the wafer from an edge "E", and vice versa. In this embodiment, the conductive pad 10 will move incrementally during the rotation of wafer under the control of a controller 22, thus ensuring that the entire surface of the wafer 12 is contacted by the conductive pad 10. This, in turn, will allow the conductive pad 10 to polish all of the metal, e.g., Cu islands, on the surface of the wafer.

As should now be understood, by using the apparatus of the invention, it is possible to polish the entire surface of the wafer using an electrolytic removal process. In embodiments, the metal or Cu is polished from the wafer by ensuring that the entire wafer comes into contact with a conductive pad in accordance with the invention.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of exemplary embodiments, those skilled in the art will recognize that the invention can be practiced with modifications and in the spirit and scope of the appended claims.

What is claimed is:

1. An apparatus comprising a conductive pad having a plurality of alternating cathodes and anodes each of which are configured as stripes above a surface of the conductive pad and extending from one edge to another edge of the conductive pad, and which are provided with a power source and a plurality of gaps each of which is between pairs of the plurality of alternating cathodes and anodes, the conductive pad being structured and configured to contact all metal islands on a surface of the wafer, and further comprising a plurality of non-conductive pads, each of which are in a respective one of the plurality of gaps, the plurality of non-conductive pads extending from one edge to another edge of the conductive pad, wherein:
    the stripes and non-conductive pads are parallel,
    the conductive pad is circular,
    each adjacent parallel stripe is of a different length,
    each adjacent parallel non-conductive pad is of a different length, and
    each adjoining parallel stripe and non-conductive pads are of a different length.
2. The apparatus of claim 1, wherein the plurality of alternating cathodes and anodes are made from a polymeric conductive material, metal or metal alloy.
3. The apparatus of claim 1, wherein the non-conductive pad is a perforated non-conductive polymeric pad.
4. The apparatus of claim 3, wherein the non-conductive pad includes at least one of an electrolyte and slurry.
5. The apparatus of claim 1, wherein the plurality of alternating cathodes and anodes comprises an abrasive material.
6. The apparatus of claim 1, further comprising a low conductivity solution used as an electrolyte.
7. The apparatus of claim 6, wherein the electrolyte includes an abrasive.
8. The apparatus of claim 1, wherein the power source is an independent power source to pairs of the plurality of alternating cathodes and anodes.
9. The apparatus of claim 1, further comprising a moving mechanism which is structured to move the conductive pad in a linear motion along a surface of the wafer from an edge to a center thereof.
10. The apparatus of claim 1, wherein the conductive pad is larger than a diameter of the wafer to be polished.
11. An apparatus for polishing a wafer surface, comprising:
    a table;
    a conductive pad coupled to the table and having a plurality of alternating cathodes and anodes arranged as parallel stripes above a surface of the conductive pad, the parallel stripes extending from one edge to another edge of the conductive pad; and
    a moving mechanism which is configured to move the table about an entire surface of a wafer to be polished thereby ensuring that the conductive pad contacts all metal islands on the surface as the wafer is rotated;
    a gap between each of the plurality of alternating cathodes and anodes;
    a perforated non-conductive polymeric pad having an electrolyte provided in each gap between the alternating cathode and anodes, wherein:
        the stripes and perforated non-conductive polymeric pad in each gap are parallel;
        the conductive pad is circular;
        each adjacent parallel stripe is of a different length;
        each adjacent parallel non-conductive pad is of a different length, and
        each adjoining parallel stripe and non-conductive pads are of a different length.
12. The apparatus of claim 11, wherein the moving mechanism is one of a rack and pinion system, belt system and actuator to move the conductive pad from at least a center portion of the wafer to an edge of the wafer and/or vice versa.
13. The apparatus of claim 11, wherein the moving mechanism is a rotating mechanism for rotating the conductive pad about the entire surface of the wafer.
14. The apparatus of claim 11, wherein the plurality of alternating cathodes and anodes are made from a polymeric conductive material, metal or metal alloy and further includes an abrasive material.
15. The apparatus of claim 11, further comprising an independent power source to pairs of the plurality of alternating cathodes and anodes.
16. The apparatus of claim 1, further comprising a power source or a controller each of which is configured to independently supply each cathode and anode pair with different voltages from a center to an edge.
17. The apparatus of claim 11, wherein:
    the cathodes and anodes are powered with different voltage profiles from a center to edge by independently supplying each cathode and anode pair with a power source or controlling the power source with a controller.

* * * * *